United States Patent
Ha et al.

(10) Patent No.: US 8,665,791 B2
(45) Date of Patent: Mar. 4, 2014

(54) APPARATUS AND METHOD FOR PROVIDING MULTIMEDIA BROADCAST/MULTICAST SERVICE IN MOBILE COMMUNICATION SYSTEM

(75) Inventors: Sang-Hyun Ha, Suwon-si (KR); Gyu-Il Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 165 days.

(21) Appl. No.: 13/145,862

(22) PCT Filed: Jan. 22, 2010

(86) PCT No.: PCT/KR2010/000425
§ 371 (c)(1),
(2), (4) Date: Jul. 22, 2011

(87) PCT Pub. No.: WO2010/085115
PCT Pub. Date: Jul. 29, 2010

(65) Prior Publication Data
US 2011/0280173 A1   Nov. 17, 2011

(30) Foreign Application Priority Data
Jan. 23, 2009  (KR) .................. 10-2009-0005945

(51) Int. Cl.
*H04W 4/00*  (2009.01)
(52) U.S. Cl.
USPC .......... 370/328; 370/310; 370/312; 370/338; 370/390; 370/400

(58) Field of Classification Search
None
See application file for complete search history.

(56) References Cited

U.S. PATENT DOCUMENTS

| | | | |
|---|---|---|---|
| 2008/0037468 A1* | 2/2008 | Zisimopoulos et al. | 370/331 |
| 2008/0293399 A1* | 11/2008 | Xu et al. | 455/422.1 |
| 2009/0147670 A1* | 6/2009 | Hu | 370/216 |
| 2010/0027541 A1* | 2/2010 | Eriksson et al. | 370/390 |
| 2010/0111060 A1* | 5/2010 | Olsson et al. | 370/338 |

FOREIGN PATENT DOCUMENTS

| | | | | |
|---|---|---|---|---|
| CN | WO 2008019627 | * | 2/2008 | ............. H04L 12/46 |
| CN | WO2008019627 | * | 2/2008 | ............. H04L 12/46 |
| KR | 10-0487231 B1 | | 5/2005 | |
| KR | 10-2008-0004891 A | | 1/2008 | |
| WO | 2008/044971 A1 | | 4/2008 | |

OTHER PUBLICATIONS

3GPP TR 23.809 V1.0.0, Sep. 2006.*

* cited by examiner

*Primary Examiner* — Jae Y Lee
(74) *Attorney, Agent, or Firm* — Jefferson IP Law, LLP

(57) ABSTRACT

A mobile communication system for supporting a Multimedia Broadcast/Multicast Service (MBMS) is provided. More particularly, an apparatus and a method for applying a direct tunnel feature in order to reduce a transmission delay of a mobile communication system for providing an MBMS. The system includes a Gateway GPRS Support Node (GGSN). The GGSN omits transmission of data to a Serving GPRS Support Node (SGSN) and transmits data to a Radio Network Controller (RNC) using the direct tunnel feature when transmitting data.

27 Claims, 5 Drawing Sheets

| INFORMATIONELEMENT | PRIVATE EXTENSION | REFERENCE |
|---|---|---|
| TUNNEL ENDPOINT IDENTIFIER USER PLANE | MANDATORY | TS29.0607.7.14 |
| RNC ADDRESS FOR USER PLANE | MANDATORY | TS29.0607.7.32 |
| PRIVATE EXTENSION | OPTIONAL | TS29.0607.7.46 |

FIG.4A

| INFORMATIONELEMENT | PRESENCEREQUIREMENT | REFERENCE |
|---|---|---|
| CAUSE | MANDATORY | TS29.0607.7.1 |
| PRIVATE EXTENSION | OPTIONAL | TS29.0607.7.46 |

FIG.4B

APPARATUS AND METHOD FOR PROVIDING MULTIMEDIA BROADCAST/MULTICAST SERVICE IN MOBILE COMMUNICATION SYSTEM

PRIORITY

This application claims priority to an application filed as PCT/KR2010/000425 on Jan. 22, 2010 claiming priority of the Korean Application filed in Korean Intellectual Property Office on Jan. 23, 2009 and assigned Serial No. 10-2009-0005945, the contents of which are incorporated herein by reference.

BACKGROUND OF THE INVENTION

1. Field of the Invention

The present invention relates to a mobile communication system for supporting a multimedia broadcast/multicast service. More particularly, the present invention relates to an apparatus and a method for applying a direct tunnel feature in order to reduce a transmission delay of a mobile communication system for providing a Multimedia Broadcast/Multicast Service (MBMS).

2. Description of the Related Art

Today, with development of a communication technology, a service provided by a Code Division Multiple Access (CDMA) mobile communication system is evolving into multicasting multimedia communication for transmitting a large capacity data such as packet data, circuit data, etc. as well as a voice service. Therefore, to support the multicasting multimedia communication, a broadcast/multicast service for providing a service from one data source to a plurality of user terminals has been proposed. The broadcast/multicast service may be divided into a Cell Broadcast Service (CBS) which is a message dominant service, and a Multimedia Broadcast/Multicast Service (MBMS) for supporting a multimedia type such as real-time images and voices, still images, characters, etc.

Here, a mobile communication system for providing the MBMS is described below.

First, a Multicast/Broadcast-Service Center (MB-SC) which is a source providing an MBMS stream schedules a stream for an MBMS service and transfers the same to a transmission network. The transmission network denotes a network existing between the MB-SC and a Serving GPRS Support Node (SGSN), and transfers a stream for an MBMS service transferred from the MB-SC to the SGSN. Here, the SGSN may be configured using a Gateway GPRS Support Node (GGSN) and an external network, and assuming that a plurality of terminals that desire to receive an MBMS service at an arbitrary point exist, the SGSN that has received a stream for the MBMS service from the transmission network plays a role of controlling an MBMS related service of subscribers (terminals) that desire to receive the MBMS service. For example, the SGSN manages MBMS service billing related data of each subscriber and selectively transmits MBMS service related data to a specific Radio Network Controller (RNC). Accordingly, the Base Station Controller (BSC) transmits relevant service data to relevant terminals to allow the terminals to use the MBMS service.

That is, in the above-described MBMS service providing method, the GGSN transmits traffic to the BSC by way of the SGSN. The GGSN, SGSN, and BSC perform a session start process of transmitting/receiving a MBMS Session Start Request/Response message to/from a neighbor node, and then sequentially transfer data received from the GGSN to a node that has transmitted a previous MBMS session start response.

Accordingly, lots of nodes exist unnecessarily between terminals and the MB-SC in the mobile communication system while an MBMS service is provided, so that a transmission delay increases and a signal control is concentrated on the SSGN and so a load of the SSGN occurs.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for reducing a transmission delay that occurs when providing an MBMS in a mobile communication system.

Another aspect of the present invention is to provide an apparatus and a method for reducing a transmission delay using a direct tunnel feature when providing an MBMS in a mobile communication system.

Still another aspect of the present invention is to provide an apparatus and a method for generating a session update request message including information of a relevant terminal in order to provide an MBMS using a direct tunnel feature in a mobile communication system.

In accordance with an aspect of the present invention, an apparatus for providing a Multimedia Broadcast/Multicast Service (MBMS) in a mobile communication system is provided. The apparatus includes a Gateway GPRS Support Node (GGSN) for omitting data transmission to a Service GPRS Support Node (SGSN) and allowing data transmission to a Base Station Controller (BSC) to be performed using a direct tunnel feature when transmitting data.

In accordance with another aspect of the present invention, a method for providing an MBMS in a mobile communication system is provided. The method includes a data transmission process of a Gateway GPRS Support Node (GGSN) that omits data transmission to a Service GPRS Support Node (SGSN) and transmits data to a Base Station Controller (BSC) using a direct tunnel feature when transmitting data.

Exemplary embodiments of the present invention provide an apparatus and a method for providing an MBMS, that omits data transmission to an SGSN using a direct tunnel feature in order to reduce a transmission delay of a mobile communication system providing an MBMS, so that a transmission delay that occurs in the conventional mobile communication system is reduced and a load of the SGSN is reduced and so a great advantage is provided to real-time data transmission.

BRIEF DESCRIPTION OF THE DRAWINGS

The above and other aspects, features and advantages of certain exemplary embodiments of the present invention will be more apparent from the following description taken in conjunction with the accompanying drawings in which:

FIG. 4 is a view illustrating a construction of a message for providing an MBMS in a mobile communication system according to an exemplary embodiment of the present invention.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide an apparatus and a method for providing an MBMS using a direct tunnel feature in order to reduce a transmission delay of a mobile communication system providing the MBMS. The direct tunnel feature denotes a feature where a GGSN or a PDN-GW directly connects a GTP tunnel to an RNC or a BSC to transmit traffic by bypassing an SGSN.

Figure 1:
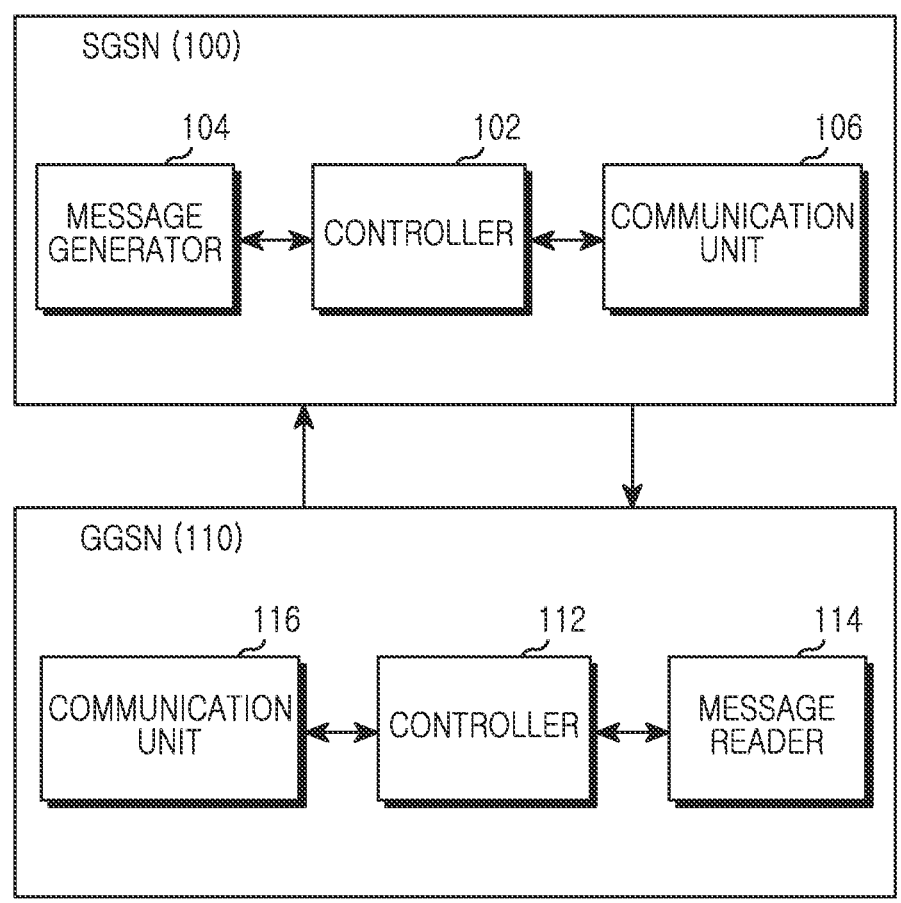
FIG. 1 is a block diagram illustrating a mobile communication system for reducing a transmission delay when providing an MBMS service according to an exemplary embodiment of the present invention.

FIG. 1 is a block diagram illustrating a mobile communication system for reducing a transmission delay when providing an MBMS service according to an exemplary embodiment of the present invention.

Referring to FIG. 1, the mobile communication system may include an SGSN 100 and a GGSN 110.

First, the SGSN 100 may include a controller 102, a message generator 104, and a communication unit 106. The GGSN 110 may include a controller 112, a message reader 114, and a communication unit 116.

The controller 102 of the SGSN 100 controls an overall operation of the SGSN 100. According to an exemplary embodiment of the present invention, to reduce a transmission delay via a direct tunnel feature, the controller 102 performs a session start process with a relevant node, and when radio resource setup is completed, the controller 102 receives information of a terminal that desires to use an MBMS service, that is, an ID of a specific terminal and Tunnel Endpoint Identifier User Plane (TEID) information which is information regarding an address of an RNC from the RNC, and generates a session update request message including the information.

After that, the controller 102 processes to transmit the generated session update request message to the GGSN 110. Accordingly, the GGSN 110 that has received the information of the terminal that desires to use the MBMS service directly transmits data to the terminal using the above information by bypassing the SGSN.

The message generator 104 generates a session update request message under control of the controller 102. That is, the message generator 104 generates the session update request message which is a message including information of the RNC for allowing the GGSN 110 to directly transmit data to the RNC using the direct tunnel feature.

The communication unit 106 communicates with a relevant node to perform a session start process. According to an exemplary embodiment of the present invention, the communication unit 106 receives information of a terminal that desires to use the MBMS service, that is, information regarding an ID of a specific terminal and an address of an RNC from the RNC.

The controller 112 of the GGSN 110 controls an overall operation of the GGSN 110. According to an exemplary embodiment of the present invention, to reduce a transmission delay via a direct tunnel feature, the controller 112 performs a session start process with a relevant node, and when radio resource setup is completed, the controller 112 receives information of a terminal that desires to use an MBMS service, that is, an ID of a specific terminal and a session update request message including information regarding an address of an RNC from the SSGN 110 to analyze the received session update request message. The controller 112 that has analyzed the message and determined the ID of the specific terminal and the address of the RNC processes to directly transmit data to the RNC corresponding to the information using the above information by bypassing the SGSN.

The message reader 114 determines information of the terminal that desires to use the MBMS service, that is, information regarding the ID of the specific terminal and information regarding the address of the RNC, included in the received session update request message, and provides the same to the controller 112 under control of the controller 112.

The communication unit 116 communicates with a relevant node to perform a session start process. According to an exemplary embodiment of the present invention, the communication unit 116 receives a session update request message including information of a terminal that desires to use the MBMS service, that is, information regarding an ID of a specific terminal and an address of an RNC from the RNC, and transmits a response message thereto.

Up to now, an apparatus for reducing a transmission delay of a mobile communication system providing an MBMS service according to an exemplary embodiment of the present invention has been described. Hereinafter, a method for providing an MBMS service using a direct tunnel feature in order to reduce a transmission delay of a mobile communication system providing the MBMS service using the above apparatus according to an exemplary embodiment of the present invention is described.

Figure 2:
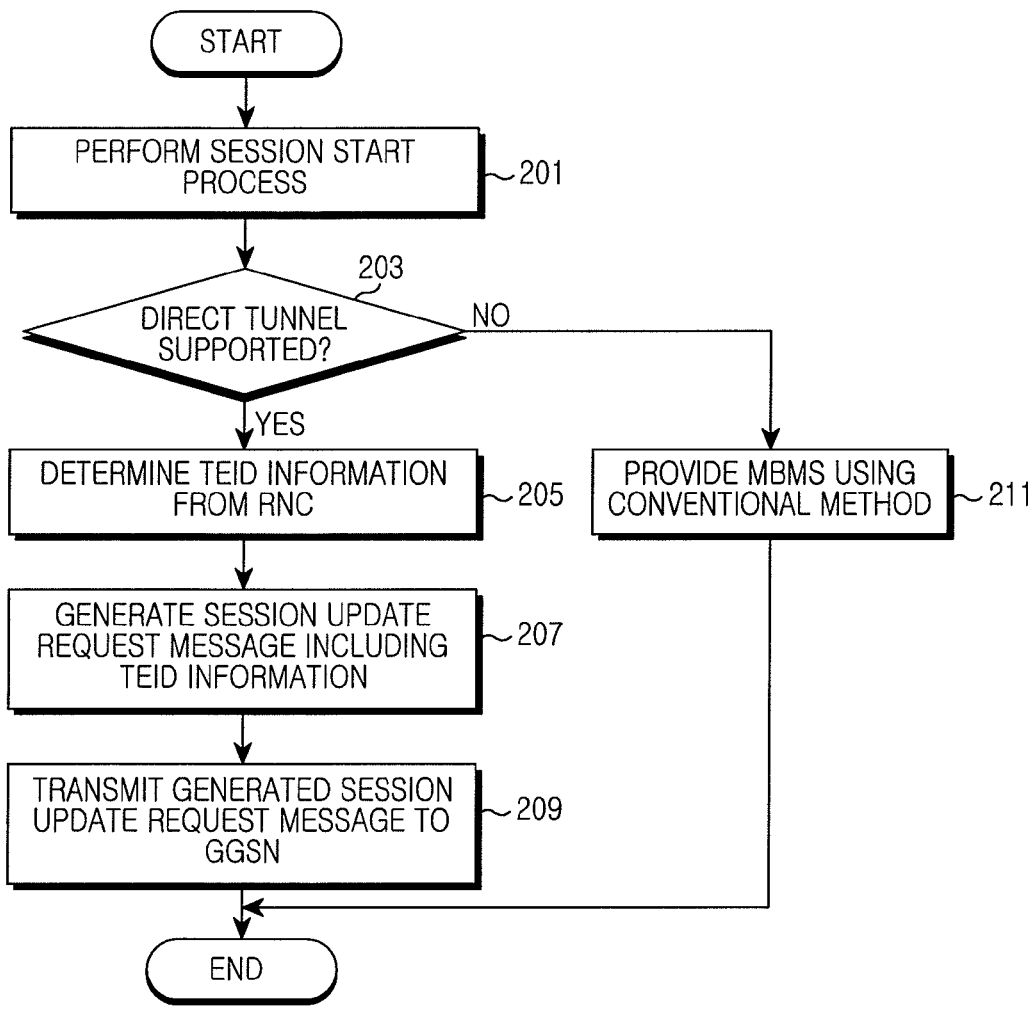
FIG. 2 is a flowchart illustrating a process for providing an MBMS in an SGSN according to an exemplary embodiment of the present invention.

FIG. 2 is a flowchart illustrating a process for providing an MBMS in an SGSN according to an exemplary embodiment of the present invention.

Referring to FIG. 2, first, the SGSN performs a session start process with a GGSN in step 201. That is, the SGSN performs the session start process while giving/taking an address for providing the service to/from the GGSN.

The SSGN proceeds to step 203 to determine whether a direct tunnel is supported. Here, the direct tunnel denotes applying a direct tunnel feature of the conventional PDP context to an MBMS bearer context. The direct tunnel is for allowing the GGSN (or PDN-GW) to transmit traffic to a base station by bypassing the SGSN when transmitting real-time traffic, thereby reducing a transmission delay.

When determining that the direct tunnel is not supported in step 203, the SGSN proceeds to step 211 to provide the MBMS service using the conventional method.

In contrast, when determining that the direct tunnel is supported in step 203, the SGSN proceeds to step 205 to determine TEID information from the RNC, and proceeds to step 207 to generate a session update request message including the TEID information. Here, the TEID information is information for supporting the direct tunnel feature according to an exemplary embodiment of the present invention. The TEID information denotes information of a terminal that desires to use the MBMS service, that is, information regarding an ID of a specific terminal and an address of an RNC. The session update request message may be represented in the form of FIG. 4A.

The SGSN proceeds to step 209 to transmit the generated session update request message to the GGSN to transmit information of the RNC that should transmit data to the GGSN.

After that, the SGSN ends the present algorithm.

Figure 3:
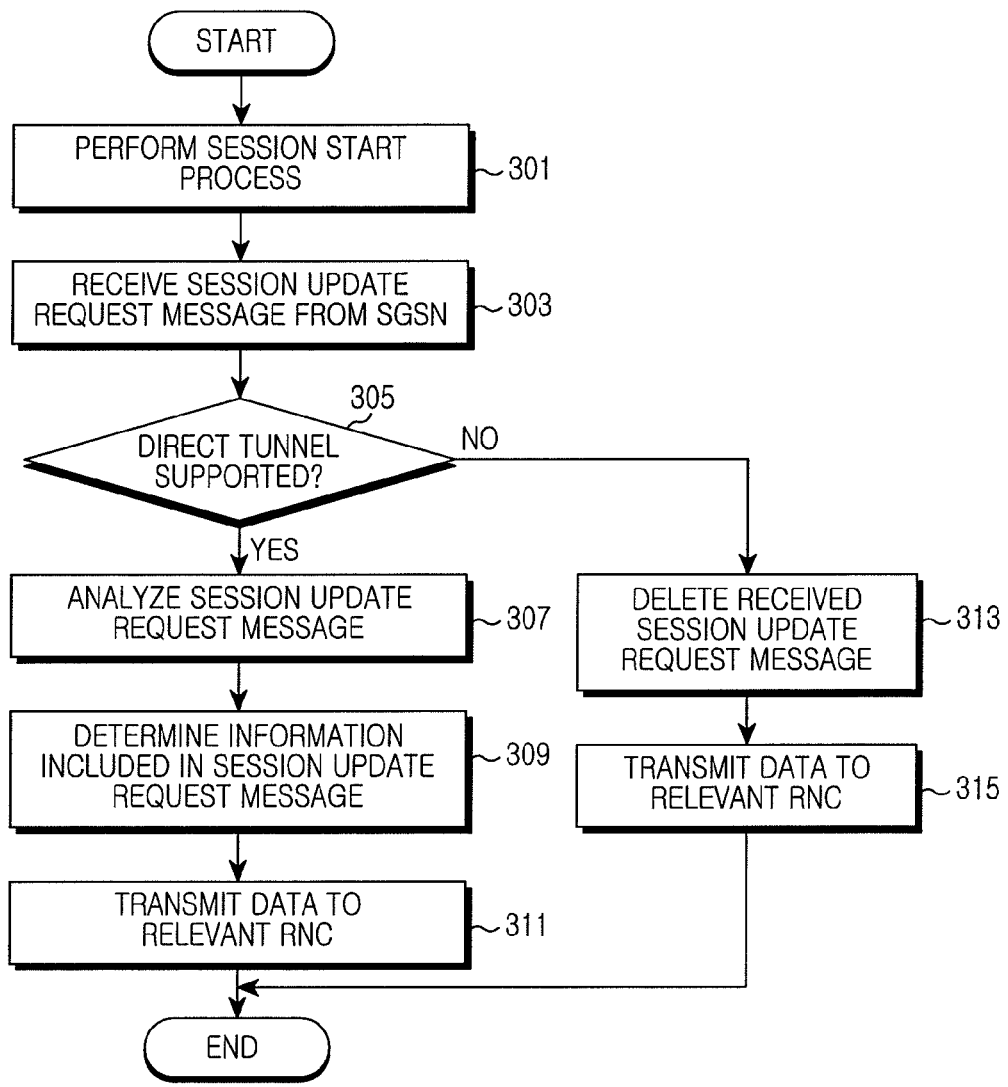
FIG. 3 is a flowchart illustrating a process for providing an MBMS in a GGSN according to an exemplary embodiment of the present invention.

FIG. 3 is a flowchart illustrating a process for providing an MBMS in a GGSN according to an exemplary embodiment of the present invention.

Referring to FIG. 3, first, the GGSN performs a session start process with a SGSN and an MB-SC in step 301. That is, the GGSN performs the session start process while giving/taking an address for providing the service to/from the SGSN and the MB-SC.

The GGSN proceeds to step 303 to receive a session update request message from the SGSN and then proceeds to step 305 to determine whether a direct tunnel is supported. Here, the session update request message is information for supporting the direct tunnel feature according to an exemplary embodiment of the present invention. The session update request message denotes a message including information of a terminal that desires to use the MBMS service, that is, information regarding an ID of a specific terminal and an address of an RNC. The session update request message may be represented in the form of FIG. 4A.

In addition, the direct tunnel denotes applying a direct tunnel feature of the conventional PDP context to an MBMS bearer context. The direct tunnel is for allowing the GGSN (or PDN-GW) to directly transmit traffic to the RNC by bypassing the SGSN when transmitting real-time traffic, thereby reducing a transmission delay.

When determining that the direct tunnel is not supported in step 305, the GGSN proceeds to step 313 to delete the received session update request message, and proceeds to step 315 to provide the MBMS service using the conventional method. That is, when the direct tunnel is not supported, the GGSN performs a general operation of passing through the SGSN when transmitting traffic in real-time. At this point, when the direct tunnel is not supported, the received session update request message becomes an undefined message, so that the GGSN deletes the received message, and the SGSN cannot receive a response message from the GGSN within a predetermined time. Accordingly, the GGSN does not perform the direct tunnel feature and provides the MBMS service using the conventional method.

In contrast, when determining the direct tunnel feature is supported in step 305, the GGSN proceeds to step 307 to analyze the session update request message, and proceeds to step 309 to determine information included in the session update request message. Here, the GGSN determines information of an RNC that will directly transmit relevant data in order to perform a direct tunnel feature.

The GGSN proceeds to step 311 to transmit the data to the relevant RNC, that is, the RNC corresponding to the information included in the session update request message. That is, the GGSN uses the direct tunnel feature that directly connects a GTP tunnel to the RNC and transmits traffic by bypassing the SGSN when transmitting data.

After that, the GGSN ends the present algorithm.

FIG. 4 is a view illustrating a construction of a message for providing an MBMS in a mobile communication system according to an exemplary embodiment of the present invention.

FIG. 4A is a view illustrating a construction of a session update request message for providing an MBMS in a mobile communication system according to an exemplary embodiment of the present invention.

Referring to FIG. 4A, the session update request message includes "Tunnel Endpoint Identifier User Plane" information representing a unique ID of a terminal that is provided with an MBMS service and "RNC address for User Plane" information representing an address of a relevant RNC for directly transferring the MBMS data to the RNC by bypassing the SGSN.

That is, the SGSN transfers the information of the unique ID of the terminal received from the RNC to the GGSN, so that the GGSN directly transfers the MBMS data to the RNC, thereby reducing a transmission delay.

FIG. 4B is a view illustrating a construction of a session update request response message for providing an MBMS in a mobile communication system according to an exemplary embodiment of the present invention.

Referring to FIG. 4B, the session update request response message denotes a response message that the GGSN that has received a session update request message from the SGSN transmits to the SGSN.

Figure 5:
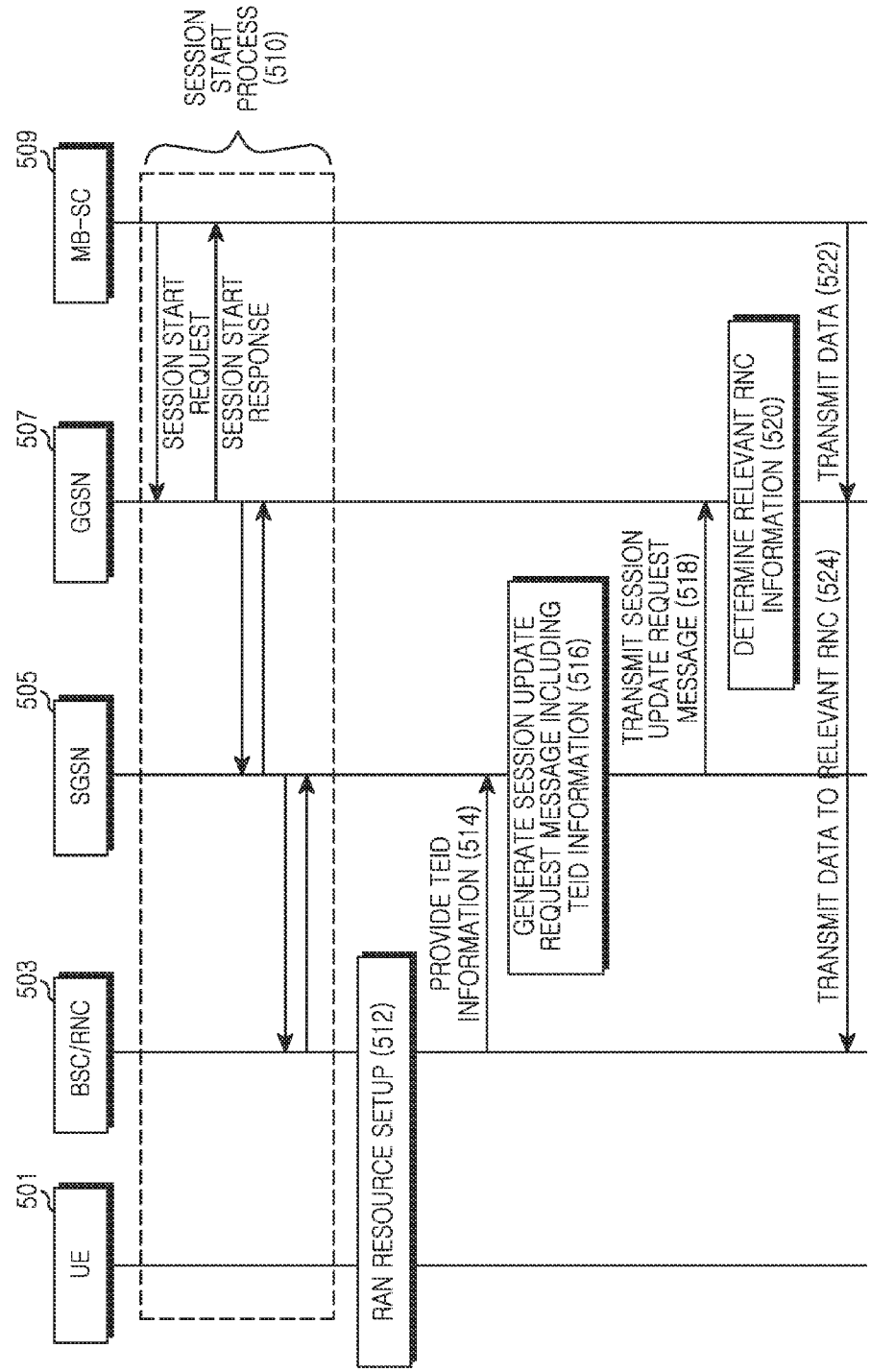
FIG. 5 is a view illustrating a process for providing an MBMS in a mobile communication system according to an exemplary embodiment of the present invention.

FIG. 5 is a view illustrating a process for providing an MBMS in a mobile communication system according to an exemplary embodiment of the present invention.

Referring to FIG. 5, the mobile communication system may include a User Equipment (UE) 501, an RNC 503, an SGSN 505, a GGSN 507, and an MB-SC 509.

First, the RNC 503, the SGSN 505, the GGSN 507, and the MB-SC 509 perform (510) a session start process for giving and taking a session start request and a response thereto between them, and then set (512) a radio resource between the terminal 501 and the RNC 503.

The session start process 510 and the radio resource setup process 512 are the same as the MBMS service providing process of the conventional mobile communication system.

However, a difference between the mobile communication system according to an exemplary embodiment of the present invention and the conventional mobile communication system is as follows.

First, after the conventional mobile communication system performs the above process, when transmitting data, the MB-SC transmits the data to the GGSN, and accordingly, the GGSN transmits the received data to the SGSN. After that, the SGSN transfers the data received from the GGSN to the RNC to transmit the same to relevant terminals. That is, to transmit data to be received to respective terminals, the conventional mobile communication system sequentially transmits the data to relevant nodes, so that a transmission delay may occur.

However, the mobile communication system according to an exemplary embodiment of the present invention uses a direct tunnel feature where the GGSN that has received (514) a session update request message including information representing a unique ID of a terminal, received from the SGSN 505 directly transfers relevant data instead of transmitting the relevant data to the SGSN 505, thereby reducing a transmission delay.

In more detail, the mobile communication system according to an exemplary embodiment of the present invention completes the radio resource setup, and then the RNC 503 provides (514) information of a specific terminal that receives data to the SGSN 505. Accordingly, the SGSN 505 generates (516) a session update request message including the information of the specific terminal, received from the RNC 503, and then transmits (518) the generated session update request message to the GGSN 507.

Accordingly, the GGSN 507 that has received the session update request message transmits a response thereto to the SGSN 505 and analyzes the request message to determine (520) information of the relevant RNC 503, that is, an address of the RNC 503 that will directly transmit data.

After that, the GGSN 507 directly transfers data 522 provided from the MB-SC 509 to the relevant RNC 503 using the direct tunnel feature instead of transmitting the data to the SGSN 505.

Accordingly, the mobile communication system according to an exemplary embodiment of the present invention may solve a transmission delay that occurs when providing an MBMS service.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. An system for providing a Multimedia Broadcast/Multicast Service (MBMS) in a mobile communication system, the system comprising:
   a specific terminal desiring to use the MBMS;
   a node with which the specific terminal desiring to use the MBMS communicates;
   a Serving GPRS Support Node (SGSN) which is configured to initiate the direct tunnel feature; and
   a Gateway GPRS Support Node (GGSN) which is configured to directly transmit data corresponding to the MBMS to the node with which the specific terminal desiring to use the MBMS communicates,
   wherein after performing a session start process, the SGSN receives information of the specific terminal that desires to use the MBMS service from the RNC to generate a session update request message comprising the received information, and transmits the generated session update request message to the GGSN, and
   wherein upon receiving the session update request message from the SGSN, the GGSN determines whether the direct tunnel feature is supported, and if the GGSN determines that the direct tunnel feature is supported, the GGSN responds to the SGSN within a predefined time, and if the GGSN determines that the direct tunnel feature is not supported, the GGSN does not respond to the SGSN within the predefined time.

2. The system of claim 1, wherein the node corresponds to a Radio Network Controller (RNC), and
   wherein when the GGSN performs the direct tunnel feature, the GGSN omits transmission of data associated with the MBMS to the SGSN and directly transmits the data to the Radio Network Controller (RNC) when transmitting the data.

3. The system of claim 1, wherein the SGSN is configured to request the direct tunnel feature when the direct tunnel feature is initiated, and
   wherein the Gateway GPRS Support Node (GGSN) performs the direct tunnel feature when the GGSN directly transmits data corresponding to the MBMS to the node with which the specific terminal desiring to use the MBMS communicates.

4. The system of claim 1, wherein the information of the specific terminal that desires to use the MBMS service comprises at least one of "Tunnel Endpoint Identifier User Plane (TEID)" information representing an unique ID of the specific terminal that receives the MBMS service and "RNC Address for User Plane" information representing an address of a relevant RNC in order to directly transfer the MBMS data to the RNC by bypassing the SGSN.

5. The system of claim 1, wherein when receiving the session update request message, the GGSN analyzes the session update request message to determine the RNC to which data is to be directly transmitted, connects a General Packet Radio System Tunneling Protocol (GTP) tunnel to the determined RNC, and then directly transmits traffic to the RNC.

6. A method for providing a Multimedia Broadcast/Multicast Service (MBMS) in a mobile communication system, the method comprising:
   initiating the direct tunnel feature at a Serving GPRS Support Node (SGSN); and
   performing the direct tunnel feature at a Gateway GPRS Support Node (GGSN) such that the GGSN directly transmits data corresponding to the MBMS to a node with which a specific terminal desiring to use the MBMS communicates,
   wherein the initiating of the direct tunnel feature at the SGSN comprises
      after performing a session start process, receiving information of the specific terminal that desires to use the MBMS service from the RNC;
      generating a session update request message comprising the received information;
      transmitting the generated session update request message to the GGSN;
      receiving a response to the transmitted session update request message from the GGSN within a predetermined time if the GGSN determines that the direct tunnel feature is supported; and
      timing out as a result of not receiving a response to the transmitted session update request message from the GGSN within the predetermined time if the GGSN determines that the direct tunnel feature is not supported.

7. The method of claim 6, wherein the node corresponds to a Radio Network Controller (RNC), and
   wherein the direct tunnel feature omits transmission of data to the SGSN and directly transmits the data to the Radio Network Controller (RNC) when transmitting the data.

8. The method of claim 6, wherein the information of the specific terminal that desires to use the MBMS service comprises at least one of "Tunnel Endpoint Identifier User Plane (TEID)" information representing an unique ID of the specific terminal that receives the MBMS service and "RNC Address for User Plane" information representing an address of a relevant RNC in order to directly transfer the MBMS data to the RNC by bypassing the SGSN.

9. The method of claim 6, wherein the performing of the direct tunnel feature at the GGSN comprises:
   when receiving the session update request message, analyzing the session update request message to determine an RNC to which data is to be directly transmitted;
   connecting a General Packet Radio System Tunneling Protocol (GTP) tunnel to the determined RNC; and
   directly transmitting traffic to the RNC.

10. A method of a Gateway GPRS Support Node (GGSN) for providing a Multimedia Broadcast/Multicast Service (MBMS) in a mobile communication system, the method comprising:
   receiving a session update request message;
   determining whether a direct tunnel feature is supported upon receipt of the session update request message;

transmitting a response to the session update request message within a predetermined time, if the GGSN determines that the direct tunnel feature is supported;

deleting the received session update request message if the GGSN determines that the direct tunnel feature is not supported; and directly transmitting data corresponding to the MBMS to the node with which the specific terminal communicates if the GGSN determines that the direct tunnel feature is supported.

11. The method of claim 10, wherein a Serving GPRS Support Node (SGSN) initiates the direct tunnel feature using an ID of a specific terminal that desires to use the MBMS service and a Tunnel Endpoint Identifier User Plane (TEID) to generate the session update request message.

12. The method of claim 10, wherein the node corresponds to a Radio Network Controller (RNC), and wherein when the GGSN performs the direct tunnel feature, the GGSN omits transmission of data associated with the MBMS to a SGSN and directly transmits the data to the RNC when transmitting the data.

13. The method of claim 10, wherein the information of the specific terminal that desires to use the MBMS service comprises at least one of "TEID" information representing an unique ID of the specific terminal that receives the MBMS service and "RNC Address for User Plane" information representing an address of a relevant RNC in order to directly transfer the MBMS data to the RNC by bypassing a SGSN.

14. The method of claim 10, wherein when receiving the session update request message, the GGSN analyzes the session update request message to determine the RNC to which data is to be directly transmitted, connects a General Packet Radio System Tunneling Protocol (GTP) tunnel to the determined RNC, and then directly transmits traffic to the RNC.

15. A method of a Serving GPRS Support Node (SGSN) for providing a Multimedia Broadcast/Multicast Service (MBMS) in a mobile communication system, the method comprising:

receiving an ID of a specific terminal that desires to use the MBMS service and a "Tunnel Endpoint Identifier User Plans (TEID)" information when a radio resource setup is completed, wherein the "TEID" information includes an address of a node with which the specific terminal communicates;

generating a session update request message comprising the ID of the specific terminal and the "TEID" information;

transmitting the session update request message;

receiving a response to the session update request message within a predetermined time; and timing out as a result of not receiving a response to the transmitted session update request message within the predetermined time.

16. The method of claim 15, wherein a SGSN initiates the direct tunnel feature using the ID of a specific terminal that desires to use the MBMS service and the TEID to generate the session update request message.

17. The method of claim 15, wherein the node corresponds to a Radio Network Controller (RNC).

18. The method of claim 15, wherein the information of the specific terminal that desires to use the MBMS service comprises at least one of "TEID" information representing an unique ID of the specific terminal that receives the MBMS service and "RNC Address for User Plane" information representing an address of a relevant RNC in order to directly transfer the MBMS data to the RNC by bypassing the SGSN.

19. An apparatus of a Gateway GPRS Support Node (GGSN) for providing a Multimedia Broadcast/Multicast Service (MBMS) in a mobile communication system, the apparatus comprising:

a communication unit configured to receive a session update request message and transmit a response message;

a controller configured to perform a session start process with a relevant node and analyze the received session update request message; and a message reader configured to determine information of the terminal that desires to use the MBMS service and to provide the information of the terminal that desires to use the MBMS to the controller under control of the controller, wherein the controller is further configured to determine whether the direct tunnel feature is supported upon receipt of the session update request message, generate a response to the session update request message within a predetermined time, if the GGSN determines that the direct tunnel feature is supported, and delete the received session update request message if the GGSN determines that the direct tunnel feature is not supported, and wherein the communication unit is further configured to transmit the response to the session update request message within a predetermined time, if the GGSN determines that the direct tunnel feature is supported, and directly transmit data corresponding to the MBMS to the node with which the specific terminal communicates if the GGSN determines that the direct tunnel feature is supported.

20. The apparatus of claim 19, wherein a SGSN initiates the direct tunnel feature using an ID of a specific terminal that desires to use the MBMS service and a Tunnel Endpoint Identifier User Plane (TEID) to generate the session update request message.

21. The apparatus of claim 19, wherein the node corresponds to a Radio Network Controller (RNC), and wherein when the GGSN performs the direct tunnel feature, the GGSN omits transmission of data associated with the MBMS to a SGSN and directly transmits the data to the RNC when transmitting the data.

22. The apparatus of claim 19, wherein the information of the specific terminal that desires to use the MBMS service comprises at least one of "TEID" information representing an unique ID of the specific terminal that receives the MBMS service and "RNC Address for User Plane" information representing an address of a relevant RNC in order to directly transfer the MBMS data to the RNC by bypassing a SGSN.

23. The apparatus of claim 19, wherein when receiving the session update request message, the GGSN analyzes the session update request message to determine the RNC to which data is to be directly transmitted, connects a General Packet Radio System Tunneling Protocol (GTP) tunnel to the determined RNC, and then directly transmits traffic to the RNC.

24. An apparatus of a Serving GPRS Support Node (SGSN) for providing a Multimedia Broadcast/Multicast Service (MBMS) in a mobile communication system, the apparatus comprising:

a communication unit configured to receive information of a terminal that desires to use the MBMS service;

a controller configured to perform a session start process with a relevant node and generates a session update request message including the received information; and a message generator configured to generate a session update request message under control of the controller, wherein the controller is further configured to receive an ID of a specific terminal that desires to use the MBMS service and a "Tunnel Endpoint Identifier User Plans (TEID)" information when a radio resource setup is completed, wherein the "TEID" information includes an address of a node with which the specific terminal communicates;

generate a session update request message comprising the ID of the specific terminal and the "TEID" information;

receive a response to the session update request message within a predetermined time; and time out as a result of not receiving a response to the transmitted session update request message within the predetermined time, wherein the communication unit is further configured to transmit the session update request message.

25. The apparatus of claim 24, wherein a SGSN initiates the direct tunnel feature using the ID of a specific terminal that desires to use the MBMS service and the TEID to generate the session update request message.

26. The apparatus of claim 24, wherein the node corresponds to a Radio Network Controller (RNC).

27. The method of claim 24, wherein the information of the specific terminal that desires to use the MBMS service comprises at least one of "TEID" information representing an unique ID of the specific terminal that receives the MBMS service and "RNC Address for User Plane" information representing an address of a relevant RNC in order to directly transfer the MBMS data to the RNC by bypassing the SGSN.

* * * * *